(12) United States Patent
Kruijer et al.

(10) Patent No.: US 12,498,182 B2
(45) Date of Patent: Dec. 16, 2025

(54) ENERGY STORAGE DEVICE AND METHOD OF HEATING A HEAT TRANSFER FLUID

(71) Applicant: SHELL USA, INC., Houston, TX (US)

(72) Inventors: Alfred Arnold Kruijer, The Hague (NL); Guy Lode Magda Maria Verbist, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 150 days.

(21) Appl. No.: 18/577,443

(22) PCT Filed: Aug. 4, 2022

(86) PCT No.: PCT/EP2022/071888
§ 371 (c)(1),
(2) Date: Jan. 8, 2024

(87) PCT Pub. No.: WO2023/012250
PCT Pub. Date: Feb. 9, 2023

(65) Prior Publication Data
US 2024/0200881 A1 Jun. 20, 2024

(30) Foreign Application Priority Data
Aug. 6, 2021 (EP) ..................................... 21190201

(51) Int. Cl.
*F28D 20/00* (2006.01)
*F28D 20/02* (2006.01)
(52) U.S. Cl.
CPC ....... *F28D 20/0056* (2013.01); *F28D 20/021* (2013.01)
(58) Field of Classification Search
CPC ............... F28D 20/0056; F28D 20/021; F28D 2020/006; F28D 2020/0065; H02J 15/00; Y02E 70/30
See application file for complete search history.

(56) References Cited

U.S. PATENT DOCUMENTS 6,877,549 B2 * 4/2005 Hirano ................ F28D 20/0056
165/902
8,056,341 B2 11/2011 Hamer et al.
(Continued)

FOREIGN PATENT DOCUMENTS

CN 108692309 A 10/2018
CN 110360863 A 10/2019
(Continued)

OTHER PUBLICATIONS

International Search Report and Written Opinion received for PCT Patent Application No. PCT/EP2022/071888, mailed on Oct. 13, 2022, 8 pages.
(Continued)

*Primary Examiner* — Travis Ruby
(74) *Attorney, Agent, or Firm* — SHELL USA, INC.

(57) ABSTRACT

This invention provides a thermal energy storage device (100) comprising a powder bed (110), at least two electrodes (301, 302, 303), and at least one heat transfer tube (200). The powder bed (110) has an electrical resistivity in a range of 500-50,000 Ωm. The at least two electrodes (301, 302, 303) are embedded in the powder bed (110) and arranged to heat the powder bed (110) by providing a voltage between the electrodes (301, 302, 303). The at least one heat transfer tube (200) is arranged to contain a heat transfer fluid and has an inlet (210) and an outlet (220) connectable to a thermal energy consumer (30). The heat transfer tube (200) and the powder bed (110) are thermally coupled via an electrically insulating material.

15 Claims, 8 Drawing Sheets

(56) References Cited

U.S. PATENT DOCUMENTS

| | | |
|---|---|---|
| 8,394,543 B2 | 3/2013 | Suyama et al. |
| 10,113,810 B2 | 10/2018 | Parkinson et al. |
| 10,247,044 B2 * | 4/2019 | Barmeier ............ F28D 20/0056 |
| 10,345,050 B2 | 7/2019 | Pietsch et al. |
| 2012/0018116 A1 * | 1/2012 | Mathur ..................... B65B 5/06 |
| | | 165/10 |
| 2014/0251310 A1 * | 9/2014 | Muren .................. F28F 13/003 |
| | | 165/157 |
| 2015/0369542 A1 * | 12/2015 | Minvielle ................ C09K 5/08 |
| | | 165/10 |
| 2017/0082380 A1 * | 3/2017 | Gauché .................. F28F 21/04 |
| 2017/0146262 A1 | 5/2017 | Weimer et al. |
| 2020/0124356 A1 * | 4/2020 | Ma ............................ F01K 3/12 |
| 2020/0166244 A1 * | 5/2020 | Aryafar .................. F22B 1/028 |
| 2022/0034598 A1 * | 2/2022 | Ma ...................... F24D 11/0214 |
| 2022/0155027 A1 | 5/2022 | Maddali |
| 2022/0307386 A1 | 9/2022 | Savic et al. |
| 2022/0307773 A1 * | 9/2022 | Zhang .................. F28D 20/028 |

FOREIGN PATENT DOCUMENTS

| | | |
|---|---|---|
| DE | 102009006784 A1 | 7/2010 |
| WO | 2014124747 A1 | 8/2014 |
| WO | 2018019858 A1 | 2/2018 |
| WO | WO-2020254001 A1 * 12/2020 | ............. F01D 25/00 |

OTHER PUBLICATIONS

Taki et al., "Electrical and thermal properties of off-stoichiometric SiC prepared by spark plasma sintering", Journal of Asian Ceramic Societies, Mar. 15, 2018, vol. 6, No. 1, pp. 95-101.

Abderrazak et al., "Silicon Carbide: Synthesis and Properties", Properties and Applications of Silicon Carbide, pp. 361-388.

"Acheson Process", Wikipedia, Retrieved on Jan. 10, 2024, webpage available at https://en.wikipedia.org/wiki/Acheson_process.

* cited by examiner

ENERGY STORAGE DEVICE AND METHOD OF HEATING A HEAT TRANSFER FLUID

CROSS REFERENCE TO RELATED APPLICATIONS

This is a National stage application of International Application No. PCT/EP2022/071888, filed Aug. 4, 2022, which claims priority of European Application No. 21190201.0 filed 6 Aug. 2021 which is incorporated herein by reference in its entirety.

FIELD OF THE INVENTION

This invention relates to a thermal energy storage device.

BACKGROUND OF THE INVENTION

In recent decades, environmental considerations and a desire to reduce man-made $CO_2$ have stimulated the development of technologies for generating electricity from renewable sources such as wind and solar power. One problem associated with the use of such renewable sources of energy is their intermittent and sometimes unpredictable availability. Wind speeds vary throughout the day and may be very low over longer periods of time. Although the position of the sun relative to a solar panel may be highly predictable, local weather variations cause large variations in the amount of solar energy captured and converted into electricity.

Not just energy production but also energy demand is variable over time. Because the variability in energy production and energy demand are not aligned, technical solutions are needed to store energy when abundantly available and to allow consumers to retrieve the stored energy when needed. With the increased use of renewable energy sources for generating electricity, a large variety of new energy storage solutions is currently being developed. Different solutions are needed for different use scenarios. Storage capacity, space constraints, portability, costs, charge speed, durability, and many other relevant factors are considered when deciding on how to temporarily store available energy for later use.

For large scale industrial applications, thermal energy storage may be used for balancing of energy demand over time. With thermal energy storage, some medium is heated electrically when there is a surplus of electrical energy available. When demand exceeds supply, the stored heat may be used to generate steam which can be used as a power source itself or converted into electricity using a steam turbine generator. The materials used for storing the thermal energy are preferably inexpensive and safe. One of the cheapest, most commonly used options is a water tank, but materials such as molten salts, sand, or metals can be heated to higher temperatures and therefore offer a higher storage capacity or higher levels of useful energy.

A common drawback of many currently available thermal energy storage systems is that some form of system is needed to convert the electrical energy produced by, e.g. the wind turbines or solar panels, into thermal energy stored in the storage medium. The international patent application WO 2020/254001 A1, for example, describes the use of an electrical heating device for heating the thermal energy storage medium. The storage medium is an electrically conductive medium with a low electrical resistivity of between 10-4 $\Omega$m and 1 $\Omega$m. According to one embodiment, the electrical heating device uses an induction coil to store electrical energy in the form of heat. In another embodiment, the electrical heating device uses contact electrodes to generate an electric current within the material and thereby heat the thermal energy storage medium. Even when heating the heat storage medium by direct contact with the contact electrodes, the heating device of WO 2020/254001 A1 still requires large and expensive transformers for first converting the high voltage of the electrical distribution grid that is fed by electricity from renewable energy sources to a much lower voltage that can be used for heating the electrically conductive medium with a low electrical resistivity.

It is an aim of the current invention to overcome at least some of the disadvantages of the known thermal energy storage systems.

SUMMARY OF THE INVENTION

According to an aspect of the invention, there is provided a thermal energy storage device comprising:
- a powder bed having an electrical resistivity in a range of between 500 $\Omega$m and 50,000 $\Omega$m;
- at least two electrodes, embedded in the powder bed and arranged to heat the powder bed by providing an electrical current therebetween;
- at least one heat transfer tube arranged to contain a heat transfer fluid, the heat transfer tube having an inlet and an outlet connectable to a thermal energy consumer, wherein the heat transfer tube and the powder bed are thermally coupled via an electrically insulating material.

According to another aspect of the invention, there is provide a method of heating a heat transfer fluid, comprising:
- providing a thermal energy storage device as above, comprising at least a powder bed, at least two electrodes, and an electrically insulating material, and at least one heat transfer tube thermally coupled to the powder bed via the electrically insulating material;
- passing an electrical current between the at least two electrodes whereby generating heat in the powder bed and thereby heating said electrically insulation material;
- passing the heat transfer fluid through the at least one heat transfer tube whereby heating the heat transfer fluid with heat from the electrically insulation material.

DETAILED DESCRIPTION OF EMBODIMENTS

Figure 1:
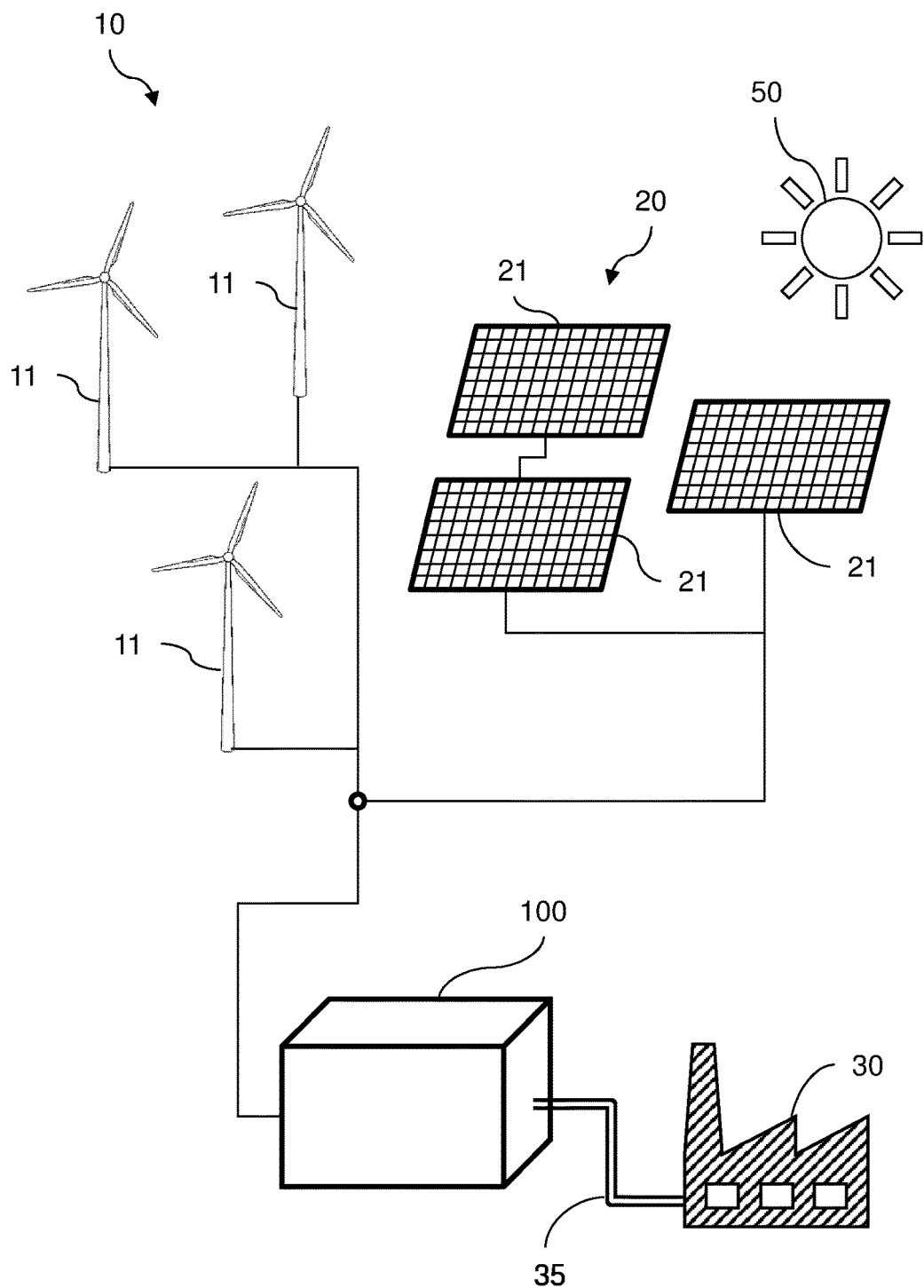
FIG. 1 schematically illustrates a wind farm, a solar farm, and a thermal energy storage device.

A thermal energy storage device is described herein, which comprises a powder bed, at least two electrodes, and at least one heat transfer tube. The powder bed has an electrical resistivity in the range of between 500 Ωm and 50,000 Ωm. The at least two electrodes are embedded in the powder bed and arranged to heat the powder bed by providing an electrical current between the electrodes. The at least one heat transfer tube is arranged to contain a heat transfer fluid and has an inlet and an outlet connectable to a thermal energy consumer. The heat transfer tube and the powder bed are thermally coupled via an electrically insulating material.

The electrical resistivity of the powder bed may advantageously be selected such that the thermal energy storage device can be connected directly to an electric energy supply without requiring the use of any transformers for first converting the high voltage of the electric energy supply to a much lower voltage that can be used for heating the electrically conductive medium between the electrodes. Such a direct connection to the electrical energy source allows the powder bed to simultaneously fulfil the functions of energy conversion and energy storage. This results not only in a significant cost reduction, but in better control over local peak temperatures too, thereby increasing the durability and the lifetime of the system.

The heating power of the electrodes is proportional to the resistance of the powder bed and the electrical current squared. According to Ohm's law, this can also be expressed as proportional to the electrical voltage squared and divided by the electrical resistance. The electrical resistance provided by the powder bed is proportional to the resistivity of the powder bed material and the electrode separation. With the above-mentioned preferred resistivity in the range of between 500 Ωm and 50,000 Ωm, practical electrode separations of, for example, from 50 cm to 200 cm may be used to achieve a suitable heating power and to heat the powder bed to suitable temperatures.

Preferably, semiconducting particles are used for the powder bed. The use of semiconductor material in powdered form allows for free thermal expansion of the electrodes and the powder bed during the heating process. When the electrodes contract while cooling down, the powder bed may self-heal under the influence of its own weight. Thus, a good contact between the electrodes and the semi-conductor material is ensured for many repeated energy storage and release cycles.

In an exemplary embodiment of the invention, the semiconductor material of the powder bed comprises a silicon carbide matrix. The silicon carbide matrix may be undoped or doped. Preferably, the silicon carbide matrix may be doped with nitrogen, phosphorus, beryllium, boron, aluminium, or gallium, or combinations thereof. An advantage of using silicon carbide particles is that it is a readily available bulk material that can be used in powdered form without requiring any post processing steps like sintering. The doped silicon carbide may, for example, have a very suitable electrical resistivity of about 1,000 Ωm. It is noted that the resistivity of the powder bed does not only depend on the material of the particles used, but also on, e.g., particle size, particle shape, and the spacing between the particles.

Preferably, the electrodes are in direct contact with the powder bed to ensure an efficient and effective heat transfer.

In an exemplary embodiment, the electrodes comprise graphite or sintered silicon carbide which provides for a good conductivity and longevity.

The electrical resistivity of the electrically insulating material is higher than that of the powder bed. In preferred embodiments, the electrically insulating material is an electrically insulating layer of a bulk material Suitable bulk materials include selected grades of silicon carbide (preferably undoped), sand, quartz, and iron ore. The heat transfer tube may be embedded in the bulk material. In addition to be readily available and relatively inexpensive, such bulk material brings the advantage that it allows the heat transfer tube to freely expand and shrink when its temperature changes, without the insulating material losing its direct contact with the heat transfer tube. Therewith an efficient and effective heat transfer between the electrically insulating layer and the heat transfer tube is ensured for repeated and long-term use. While the use of particulate bulk material is preferred, alternative solid, possibly porous, materials may be used as an alternative. For example, concrete may be a suitable material in terms of cost, electrical insulation, and thermal conduction.

In an exemplary embodiment, the thermal energy storage device comprises a plurality of thermally coupled modules, each module including:
  a heat generating layer comprising the powder bed and the at least two electrodes, and
  a heat release layer comprising the heat transfer tube and the electrically insulating material.

Some of the exemplary thermal energy storage devices described above may further comprise a buffer, thermally coupled to the powder bed and separated from the heat transfer tube by at least the powder bed. Such a buffer may further increase the total storage capacity of the thermal energy storage device and may help to control the maximum temperature of the heat generating powder bed. The buffer may comprise a material that stores energy in the form of sensible heat, or in the form of latent heat, or in a combination of both.

For example, the thermal energy storage device may comprise a plurality of thermally coupled modules, each module including:
  a first heat generating layer comprising the powder bed and the at least two electrodes,
  a heat release layer comprising the heat transfer tube and the electrically insulating material,
  a second heat generating layer comprising the powder bed and the at least two electrodes, and
  the buffer layer.

Other arrangements, such as thermally coupled modules with only one heat generating layer each are foreseen too.

Preferred thermal energy storage devices may further comprise a thermally insulating bottom layer, supporting at least the powder bed, the heat transfer tube, and the electrically insulating material. A bottom insulation layer helps to prevent a loss of heat to the soil on which the thermal energy storage device is placed. Similarly, a top insulation layer may be added to prevent a loss of heat to the air above the thermal energy storage device. Additional insulation may be provided at one or more sides of the thermal energy storage device. All insulation layers can be made of any suitable thermally insulating material. Preferably, mineral wool an inexpensive bulk material is used, for example one of the bulk materials already discussed above. Possible materials include, but are not limited to mineral wool, ceramic foams, vacuum panels, or beds of granulated insulation materials, such as sand, quartz, pumice, or volcanic ash.

In preferred embodiments, the top and/or bottom insulation layers may further comprise a cooling tube, embedded in the thermally insulating bottom layer. The cooling tube may be filled with a cooling fluid, such as water, to take up some of the heat that would otherwise have warmed the soil underneath the thermal energy storage device. The cooling tube may be connected to a pump for providing a continuous supply of cool cooling fluid. The cooling tube may further be connected to the inlet of the heat transfer tube, such that it can be used to preheat the heat transfer fluid.

The thermal energy storage devices described herein above may be used in method of heating a heat transfer fluid, wherein passing an electrical current between the at least two electrodes whereby generating heat in the powder bed and thereby heating said electrically insulation material, and passing the heat transfer fluid through the at least one heat transfer tube whereby heating the heat transfer fluid with heat from the electrically insulation material. The electric current may be fluctuating over time, such as is frequently the case when the electric current is derived from a renewable source such as a solar and/or wind power source. The electrically insulating material and the optional buffer layer act as a thermal buffer which continues to heat up the heat transfer fluid for a certain amount of time during an interruption of the electric current when no, or insufficient, electric power is available to replenish the heat that is being extracted from the device.

FIG. 1 schematically illustrates a wind farm 10, a solar farm 20, and a thermal energy storage device 100. One or more detailed examples of the thermal energy storage device 100 will be described in more detail below. When there is a suitable amount of wind, the rotating rotor blades of the wind turbines 11 in the wind farm 10 drive a generator that produces electricity. Similarly, during the day, solar panels 21 in the solar farm 20 absorb light from the sun 50 and generate electricity too. The wind farm 10 and the solar farm 20 are both electrically connected to the thermal energy storage device 100. The purpose of the thermal energy storage device 100 is to store the electric energy generated by the wind farm 10 and solar farm 20 by heating up a storage medium. The stored energy is released when needed by heating a heat transfer fluid. The heated heat transfer fluid, typically water in the form of steam, may then be led through one or more pipes 35 to a thermal energy consumer, here symbolised by a factory 30. The consumer may, for example, use the steam directly in some industrial process, or use a steam turbine generator to first convert the steam into electric power before supplying the steam to an industrial process or alternatively a steam condenser. A return flow of the heat transfer fluid (at least a portion thereof) may be cycled back to the thermal energy storage device 100 for further extracting heat therefrom.

Figure 2:
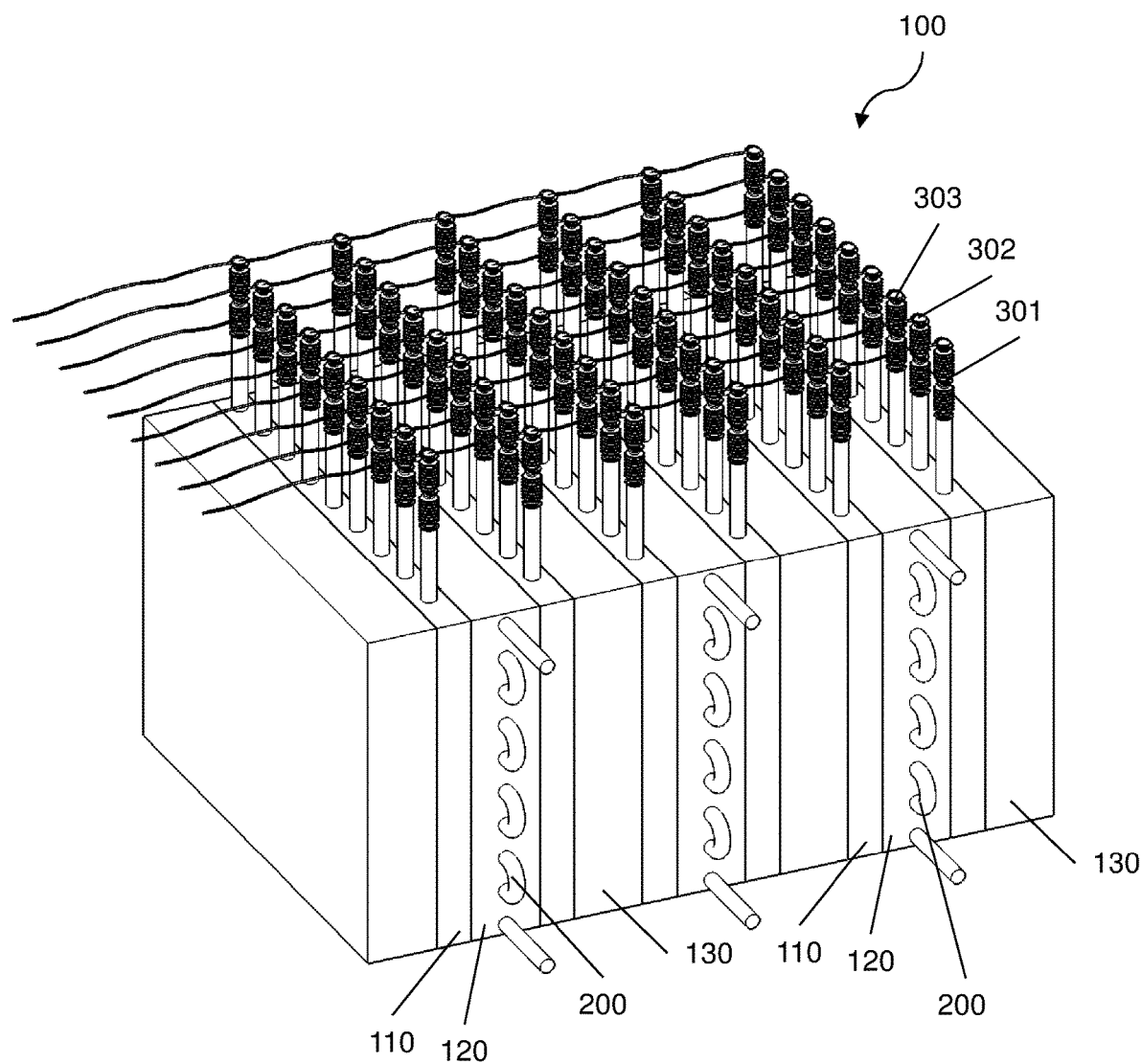
FIG. 2 schematically shows a perspective view of an embodiment of the thermal energy storage device of FIG. 1.

FIG. 2 shows a perspective view of an embodiment of the thermal energy storage device 100. The thermal energy storage device 100 is made up of a series of alternating layers 110, 120, 130 with different functions, materials, and other features. The layers may extend vertically and/or form columns. Before describing some of the materials and features that may be used in the different layers in more detail, we will first provide a short explanation of how the thermal storage device can be used to store and release energy.

An electrical current passing through the electrode layer 110 is converted into thermal energy causing the material in this layer 110 to warm up to temperatures that may, for example, exceed 800° C. In an adjacent heat release layer 120, a tube structure 200 is provided through which a heat transfer liquid, for example water, may be led to receive some of the stored energy and become a heated fluid in the form of, e.g., steam. Although a combination of a single electrode layer 110 and a single heat release layer 120 is enough for obtaining a working thermal energy device 100, a larger storage capacity and improved control over the local peak temperature, and energy storage and release process is obtained by providing a plurality of such layers in an alternating pattern. Optional buffer layers 130 may be added for further increasing the total storage capacity of and controlling the maximum temperature and release duty variation in the thermal energy storage device 100.

In this embodiment, the electrode layer 110 comprises a powder bed of a semiconductor material providing the powder bed an electrical resistivity of in the range of 500-50,000 Ωm. At least two electrodes are embedded in the powder bed and arranged to heat the powder bed by providing a voltage therebetween. The semiconductor material may, for example, comprise silicon carbide (SiC), optionally doped with a suitable amount of nitrogen, phosphorus, beryllium, boron, aluminium, or gallium to obtain the desired electrical resistivity. Doped silicon carbide has excellent electrical and thermal properties (in terms of conductance and storage capacity) for use in the electrode layer 110 of the thermal energy storage device 100. Such doped silicon carbide may, e.g., have an electrical resistivity of about 1,000 Ωm for use with an intermediate transmission grid supply voltage. Because of impurities in the bulk production of silicon carbide, undoped silicon carbide may be suitable for use as the main ingredient of the powder bed too. Undoped silicon carbide with a resistivity of up to 50,000 Ωm may, for example, be used with a high transmission grid supply voltage.

The resistivity of the powder bed does not only depend on the material of the powder bed particles used, but also on, e.g., particle size, particle shape, and the spacing between the particles. The electrical resistivity of the powder bed is preferably selected in such a way that the thermal energy storage device 100 can be connected directly to an electric energy supply, such as the wind farm 10 or the solar farm 20, without requiring the use of any transformers for first converting the high voltage of the electric energy supply to a much lower voltage that can be used for heating the electrically conductive medium between the electrodes. Such a direct connection to the electrical energy source allows the selected semiconductor material to simultaneously fulfil the functions of energy conversion and energy storage. This results in a significant cost reduction.

A further advantage of using silicon carbide is that it is a readily available bulk material that can be used in powdered form without requiring any post processing steps like sintering. The use of semiconductor material in powdered form also allows for free thermal expansion of the electrodes during the heating process. When the electrodes contract while cooling down, the powder bed may self-heal under the influence of its own weight. Thus, a good contact between the electrodes and the semi-conductor material are ensured for many repeated energy storage and release cycles. Degradation of the electrical properties of silicon carbide over time due to the prolonged exposure to high temperatures can be minimised by controlling the peak temperature in the heat generating layer, for example by limiting the peak temperature to about 800° C. Other ways to limit degradation of the powder bed material include the choice of particle size and periodic injection of a protective purge gas (e.g., nitrogen, argon, or carbon dioxide).

A preferred choice of material for the electrodes 301, 302, 303 is graphite or sintered silicon carbide. Both graphite and sintered silicon carbide electrodes have a good electrical conductivity and longevity. As discussed above, the electrodes 301, 302, 303 may be directly connected to a high-voltage power source. The voltage of such high-voltage power source may exceed 1 kV (1,000 Volts), 5 kV, or 10 kV. For example, the wind farm 10 and/or solar farm 20 may provide a 33 kV voltage employing a three-phase alternating current. In this example, a first line of interconnected first electrodes 301 may be connected to a first phase, a second line of interconnected second electrodes 302 may be connected to a second phase and a third line of interconnected third electrodes 303 may be connected to a third phase. This pattern may the repeat for fourth, fifth, sixth, and subsequent lines of interconnected electrodes. In other embodiments, lower or higher voltages (e.g., 6 kV, 11 kV, 22 kV, 66 kV), a two-phase alternating current, or even a direct current may be applied.

Applying a voltage to the electrodes 301, 302, 303 causes an electrical current to run through the semiconductor material and between two adjacent, not directly connected, electrodes. Due to the electrical resistivity of the semiconductor material, the electrode layer 110 will warm up as a result of its ohmic resistance. The highest heating (and thus temperatures, possibly up to more than 800° C.) is expected to occur near the electrodes 301, 302, 303. The electrical and heat conducting properties and heat storage capacity of the semiconductor material will determine the further distribution of the generated heat through the electrode layer 110.

The heat release layer 120 is provided adjacent the electrode layer 110 and either in direct contact therewith or in contact with an intermediate buffer layer that may comprise a different material than the electrode layer 110 and the heat release layer 120. The heat conductance and heat storage properties of the material used for this heat release layer are such that heat generated in the electrode layer 110 is effectively transferred to the heat transfer tube 200. One function of the heat release layer 120 is to dampen out the daily or hourly intermittency of the renewable energy supply in order to provide an acceptable heat supply variation to the consumer. For the functioning of the thermal energy storage device 100, it is important that the heat transfer tube 200 keeps in close contact with the heat release layer 120, such that it can efficiently exchange heat therewith. If the heat transfer tube 200 is made of a material that shrinks and expands under the influence of a change in temperature, it is preferred that the material used for the heat release layer 120 can accommodate these changes. Thus, as for the electrode layer 110, the use of a bulk material consisting of loose particles, such as a powder, is preferred.

Suitable materials that may be used for the heat release layer 120 include bulk material, such as (non-conducting) silicon carbide, sand, quartz, or iron ore. If the heat transfer tube 200 is made of an electrically conductive material, such as a metal, the material used for the heat release layer 120 is preferably not electrically conductive, such as to electrically insulate the heat transfer tube 200 and to avoid undesirable electrical currents running through it. Alternatively, the heat release layer 120 may comprise the same semiconductor material as is used for the electrode layer 110, or another electrically conductive or semi-conductive material. In that event, an insulation layer may be applied to the heat transfer tube 200 to avoid undesirable electrical currents running through it. It is, however, important that such an electric insulation layer will not significantly hinder the heat exchange between the thermal energy storage device 100 and the heat transfer fluid running through the tube 200. In other embodiments, electrical insulation layers may be provided in between the electrode layer 110 and the heat release layer 120, thereby creating an opportunity to use electrically conductive material for the heat release layer 120.

Optionally, an additional buffer layer 130 is provided for further increasing the total storage capacity of the thermal energy storage device 100 and controlling the maximum temperature. For this purpose, a material is selected based on, e.g., cost, heat conductance, and heat storage capacity. Suitable materials for use in this buffer layer include bulk material, such as (non-conducting) silicon carbide, sand, quartz, iron ore, or materials capable of storing latent heat, possibly in combination with sensible heat, such as miscibility gap alloys (MGA), solar salt or low-melting metals, conceivably comingled with a non-melting porous or bulk solid. The buffer layer 130 may, as in FIG. 2, be sandwiched between two electrode layers 110, but alternative arrangements leaving out one or two of the adjacent electrode layers 110, or adding more electrically insulating layers, are possible too.

All layers may be purged periodically or continuously, for example, using nitrogen, argon, or carbon dioxide to prevent degradation of desirable properties or moisture accumulation in the layers and/or around the electrodes 301, 302, 303 or heat transfer tubes 200.

Figure 3:
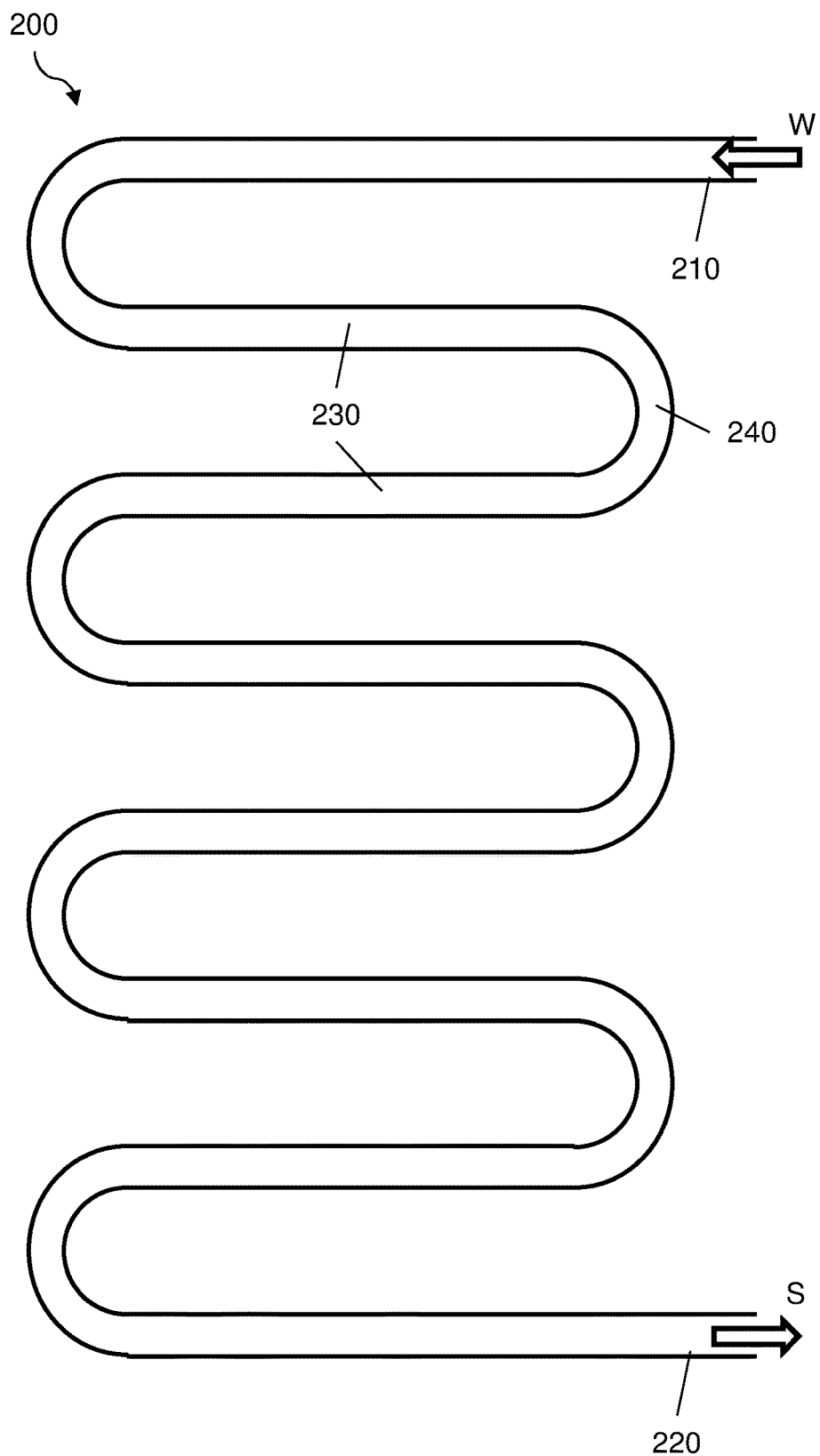
FIG. 3 schematically shows an example of a heat transfer tube for use in the thermal energy storage device of FIG. 2.

FIG. 3 shows an example of a heat transfer tube 200 for use in the thermal energy storage device of FIG. 2. The heat transfer tube 200 comprises a plurality of substantially parallel straight sections 230 that are connected to each other by interconnecting sections 240. The interconnecting sections 240 may, e.g., be curved, flanged, or executed as cross fittings. In use, for example water (W) enters the heat transfer tube 200 at the inlet 210, flows down the tube 200 while picking up heat from the heat exchange layer 130 (see FIG. 1), and finally leaves the tube 200 as steam (S) at an outlet 220. While the use of water is preferred, alternative heat transfer fluids may be used. A pump (not shown) may be provided for pumping the water into the inlet 210. After leaving the outlet 220, the steam, typically at a temperature of about 350° C., may be led to one or more consumers. The consumer may, for example, use the steam directly in some industrial process, or use a steam turbine generator to first convert the steam into electric power. Optionally, the heat transfer tube 200 and the consumer form a closed circuit, wherein the used steam is condensed into water and pumped back to the inlet 210 of the heat transfer tube 200.

In a thermal energy storage device 100 with more than one heat transfer tube 200, each inlet 210 may be connected to its own supply of heat transfer fluid and the heat transfer fluid may have a similar temperature at every inlet 210. Alternatively, two or more heat transfer tubes 200 may be interconnected such that the outlet 220 of a first heat transfer tube 200 is connected to an inlet 210 of a second heat transfer tube 200, and that the heat transfer fluid passes through the two or more heat transfer tubes before it leaves the thermal heat storage device 100 and is sent to a consumer.

The heat transfer tube 200 may be made of a metal, such as stainless steel. An important property of the material to be used for the heat transfer tube 200 is that it allows for an efficient heat exchange between the heat release layer 120 at its outside and the heat transfer fluid at its inside. Permanent contact between the heat transfer tube 200 and the heat release layer 120 can be promoted by using a granular material that freely expands or contracts relative to the tube. As already explained above, if the tube material is electrically conductive it is important that some form of electrical insulation is provided to insulate the heat transfer tube 200 from the electrodes 301, 302, 303. In addition, earthing and bonding of the heat transfer tube may be provided.

Preferably, one or more of the interconnecting sections 240 of the heat transfer tube 200 can easily be demounted from and remounted to the straight sections 230. When, as in the embodiment of FIG. 2, the interconnecting sections 240 protrude from the main body of the thermal energy storage device 100, demounting the interconnecting sections 240 allows for maintenance and inspection access to the horizontally placed straight sections 230 of the heat transfer tube 200.

Figure 4:
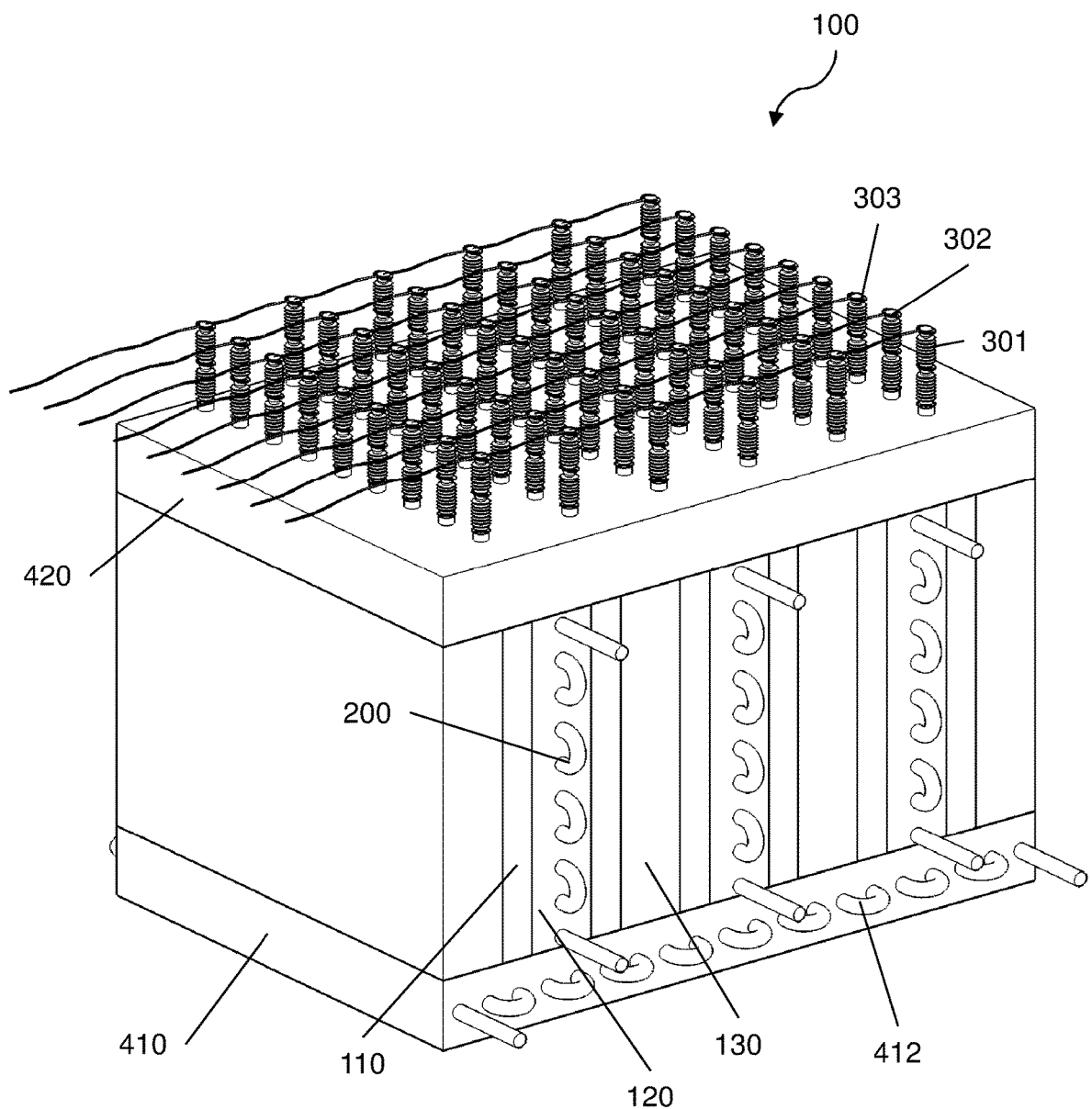
FIG. 4 schematically shows the thermal energy storage device of FIG. 2 with added thermal insulation.

FIG. 4 shows the thermal energy storage device 100 of FIG. 2 with added thermal insulation. A bottom insulation layer 410 helps to prevent a loss of heat to the soil on which the thermal energy storage device 100 is placed. The bottom insulation layer 410 can be made of any suitable thermally insulating material. Preferably, an inexpensive bulk material with good thermal insulation and load-bearing properties is used. Possible materials include, but are not limited to, sand, quartz, pumice, or volcanic ash. The bottom insulation layer 410 may include a cooling tube 412 that can be filled with a cooling fluid, such as water, to take up some of the heat that would otherwise have warmed the soil underneath the thermal energy storage device 100. The cooling tube 412 may be made of similar materials as the heat transfer tube 200. Preferably the cooling tube 412 is connected to a pump for providing a continuous supply of cool cooling fluid. The cooling tube 412 may be connected to the inlet 210 of the heat transfer tube 200, such that it can be used to preheat the heat transfer fluid.

A similar top insulation layer 420 may be provided on top of the thermal energy storage device 100 in order to prevent excessive heat loss to the direct environment. The top insulation layer 420 may comprise the same or similar materials as the bottom insulation layer 410.

Figure 5:
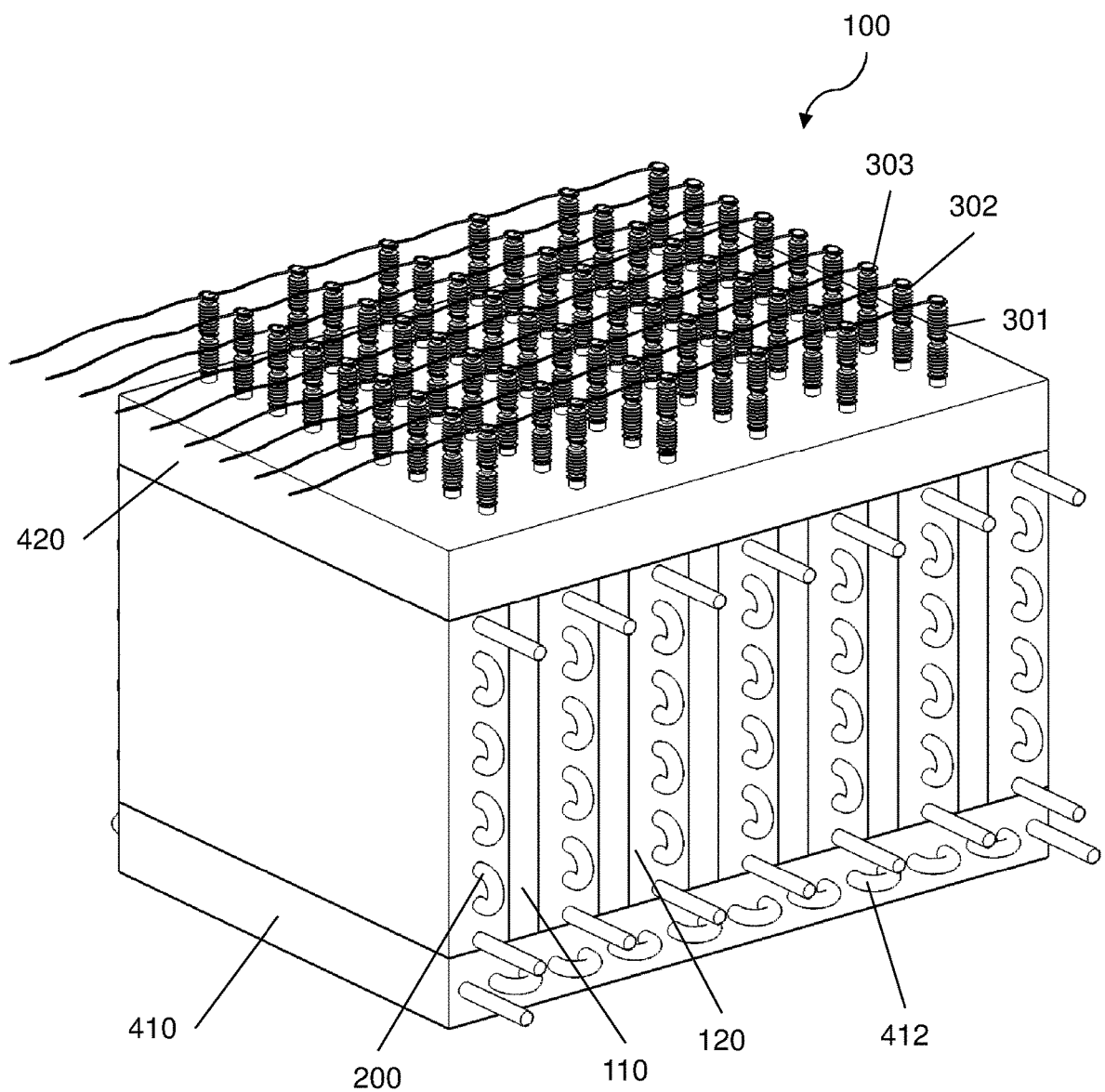
FIG. 5 schematically shows a perspective view of a different embodiment of the thermal energy storage device of FIG. 1.

FIG. 5 shows a perspective view of a different embodiment of the thermal energy storage device 100. The main difference with the thermal energy storage device 100 shown in FIG. 4 is that it does not comprise any buffer layers 130, but a repeating pattern of alternating electrode layers 110 and heat release layers 120.

Figure 6:
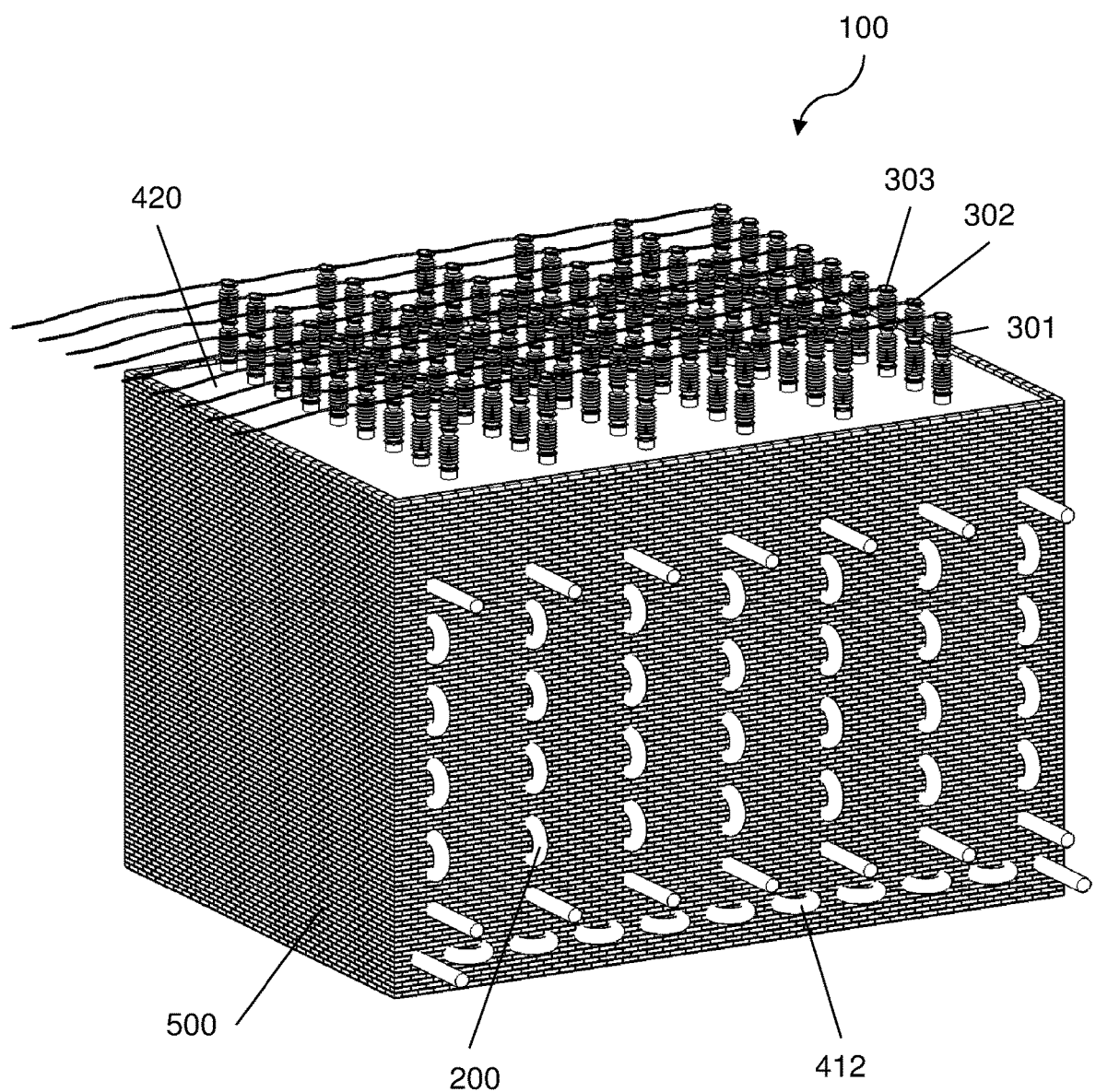
FIG. 6 schematically shows the thermal energy storage device of FIG. 5 with more added thermal insulation.

FIG. 6 shows the thermal energy storage device 100 of FIG. 5 with more added thermal insulation. A thermal insulation sleeve 500 is applied to all side walls of the thermal energy storage device 100. Many readily available thermal insulation materials may be used for this thermal insulation sleeve 500. Just as an example, perlite may be used because of its suitability for high temperatures. The possibility to add such an insulation sleeve 500 is not limited to the embodiment of FIG. 5, but may also be beneficial in other embodiments, such as those of FIGS. 2 and 4. The sides of the thermal energy storage device 100 may have vertical walls, or may be unwalled, following the natural angle of repose of the bulk material.

Figure 7:
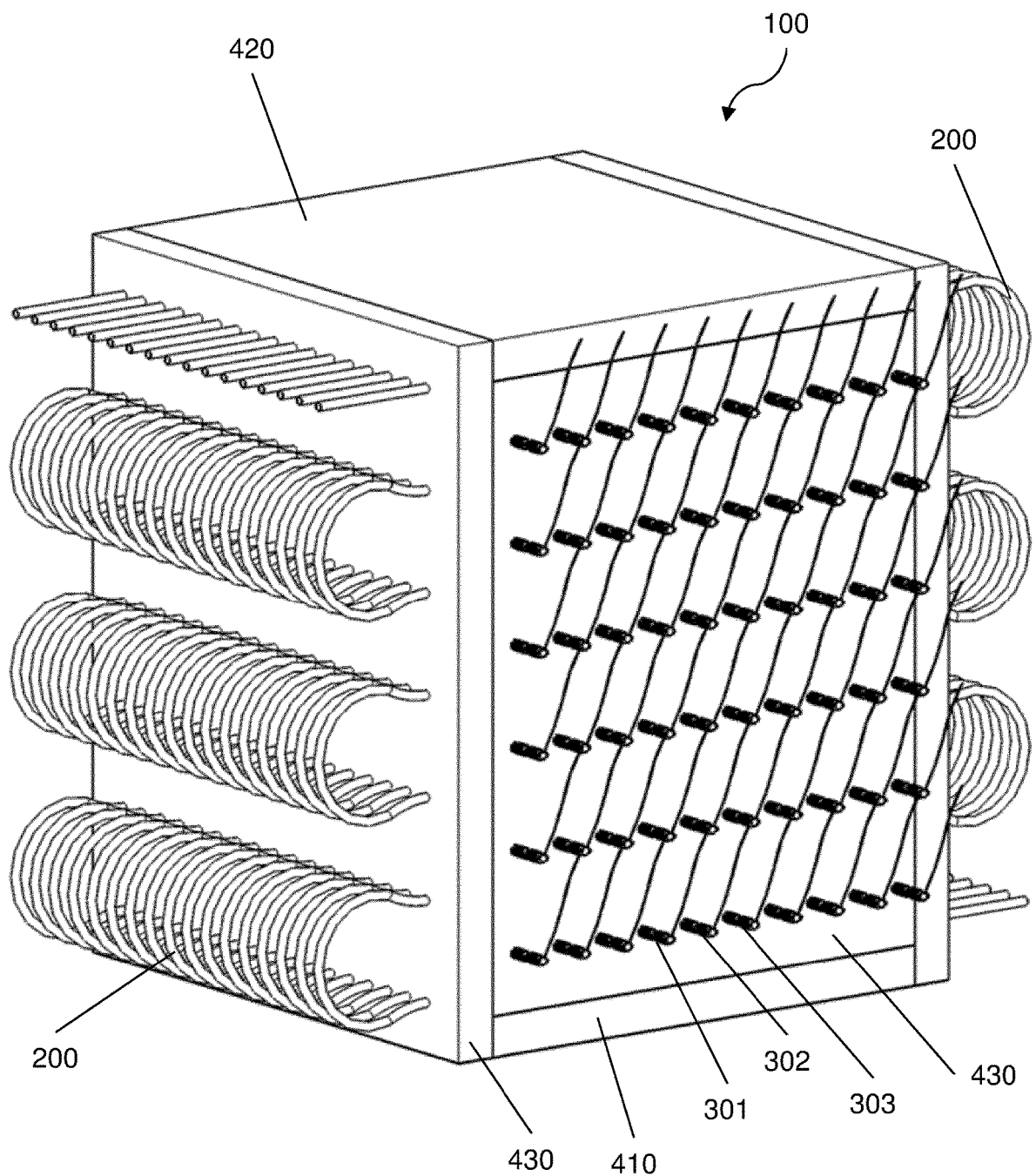
FIG. 7 schematically shows a perspective view of an alternative embodiment of the thermal energy storage device of FIG. 1.
Figure 8:
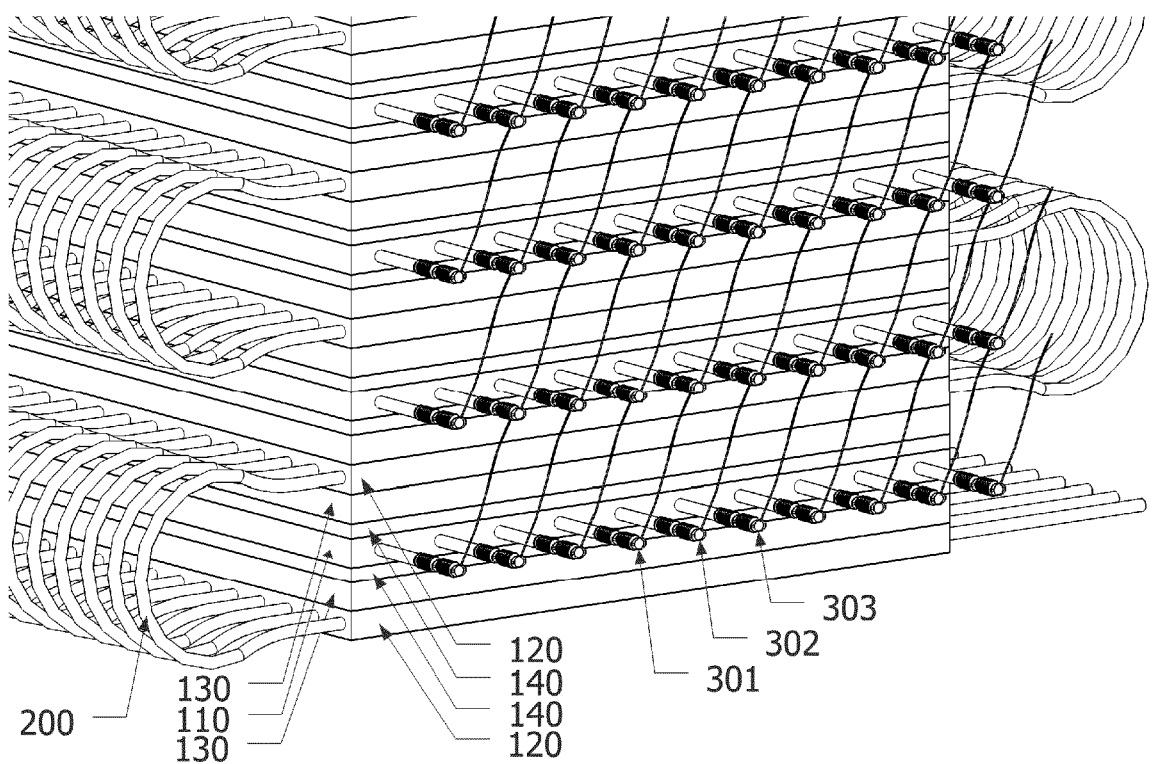
FIG. 8 schematically shows a close-up of part of the thermal energy storage device of FIG. 7 with its external insulation layers removed.

FIG. 7 shows a perspective view of an alternative embodiment of the thermal energy storage device 100. FIG. 8 shows a close-up of part of the thermal energy storage device 100 of FIG. 7 with its external insulation layers 410, 420, 430 removed. Many features of this embodiment are similar to and perform the same function as corresponding features in the embodiments described above with reference to FIGS. 2 to 6. Therefore, the same reference numbers are used for such corresponding features.

As can be clearly observed in FIG. 8, one important difference with the previously described embodiments is that the different layers 110, 120, 130, 140 have a substantially horizontal orientation. It is noted that the use of such a layered configuration may be advantageous for reasons of performance and/or ease of construction, but that the invention is not limited to such a configuration. Also, when layers are used, their orientations may differ from the substantially vertical or horizontal orientations shown in the drawings. Likely, the layers may have varying thickness and different shapes. For example, a cylindrical thermal energy storage device may be provided wherein the different layers are provided as concentric rings.

In the embodiment of FIGS. 7 and 8, the first, second and third electrodes 301, 302, 303 are aligned in parallel in a substantially horizontal electrode layer 110 that is sandwiched between two substantially horizontal electrically insulating layers 140, filled with, e.g., one of the electrically insulating bulk materials described above. An important function of these electrically insulating layers 140 is that they allow for the use of electrically conducting materials for the subsequent buffer layer 130 and heat release layer 120. The buffer layer 130 and/or heat release layer 120 may be made up of the same or different materials. All materials mentioned above for the corresponding layers 120, 130 in the embodiments described in FIGS. 2 to 6 can be used in this embodiment too.

For reducing the footprint of the thermal energy storage device, a larger heat flux per cubic meter is desirable. In a typical non-limiting example, the maximum temperature fluctuation between day and night in the heat generating electrode layer 110 is about 100° C. (e.g. cycling between 700° C. and 800° C.). A primary function of the heat release layer 120 is to dampen the day-night variation of the duty output to the consumer. This can be achieved by reducing the temperature swing in the heat generating electrode layer 110.

In order to further reduce this output duty swing, or to further increase the maximum temperature fluctuation in the heat generating electrode layer 110 between day and night to, e.g., 400° C., one or both layers 120, 130 may comprise a phase change material that can store energy in the form of latent heat. If the layer composition is such that part of it changes phase, e.g. by melting during a heating cycle and solidifying when less renewable energy is produced and the layer cools down, a more constant temperature buffer is obtained. This helps to prevent overheating of the steam tubes during periods of low consumer demand.

When using phase change material, it is important that it remains stationary within the layer 120 when in the molten state. This may, for example, be achieved by mixing a low-melting granulate with a non-melting bulk material (i.e., a bulk material with a melting temperature high enough to avoid melting during normal use of the thermal energy storage device 100). Possible combinations are 50%-50% mixtures of either magnesium (phase change at 650° C.) and iron (phase change at 1538° C.), or zinc (phase change at 420° C.) and graphite (phase change at 3600° C.), or an aluminium magnesium eutectic and either pure or mixtures of sand, silicon carbide, iron ore or graphite. When full encapsulation by the non-melting component is achieved, or when the non-melting grains remain in load-bearing contact with each other throughout the melting and solidification stages of the smeltable material and the low-melting phase is surrounded on all sides by impermeable layers, leaking to other layers is prevented. While phase change materials comprising metals are electrically conductive, the electrically insulating layer 140 is provided for electrical insulation between the electrode layer 110 and the steam tubes 200.

The person skilled in the art will readily understand that, while the detailed description of the invention has been illustrated making reference to one or more embodiments, each having specific combinations of features and measures, many of those features and measures can be equally or similarly applied independently in other embodiments or combinations. Furthermore, the person skilled in the art will understand that the present invention and its teachings can be carried out in many of various ways without departing from the scope of the appended claims.

We claim:

1. A thermal energy storage device comprising:
   a powder bed having an electrical resistivity in a range of between 500 Ωm and 50,000 Ωm;
   at least two electrodes, embedded in the powder bed and arranged to heat the powder bed by providing an electrical current therebetween; and
   at least one heat transfer tube arranged to contain a heat transfer fluid, the heat transfer tube having an inlet and an outlet connectable to a thermal energy consumer, wherein the heat transfer tube and the powder bed are thermally coupled via an electrically insulating material.

2. The thermal energy storage device as claimed in claim 1, wherein the powder bed comprises a semiconductor material.

3. The thermal energy storage device as claimed in claim 2, wherein the semiconductor material comprises a silicon carbide matrix, undoped or doped with nitrogen, phosphorus, beryllium, boron, aluminium, or gallium.

4. The thermal energy storage device as claimed in claim 1, wherein the electrodes are in direct contact with the powder bed.

5. The thermal energy storage device as claimed in claim 1, wherein the electrodes comprise graphite or sintered silicon carbide.

6. The thermal energy storage device as claimed in claim 1, wherein the electrically insulating material is an electrically insulating layer of a bulk material, such as silicon carbide, sand, quartz, or iron ore, the heat transfer tube being embedded in the bulk material.

7. The thermal energy storage device as claimed in claim 1, comprising a plurality of thermally coupled modules, each module including:
   a heat generating layer comprising the powder bed and the at least two electrodes; and
   a heat release layer comprising the heat transfer tube and the electrically insulating material.

8. The thermal energy storage device as claimed in claim 1, further comprising a buffer layer, thermally coupled to the powder bed and separated from the heat transfer tube by at least the powder bed.

9. The thermal energy storage device as claimed in claim 8, wherein the buffer layer comprises a phase change material.

10. The thermal energy storage device as claimed in claim 8, comprising a plurality of thermally coupled modules, each module including:
    a first heat generating layer comprising the powder bed and the at least two electrodes;
    a heat release layer comprising the heat transfer tube and the electrically insulating material;
    a second heat generating layer comprising the powder bed and the at least two electrodes; and
    the buffer layer.

11. The thermal energy storage device as claimed in claim 1, further comprising a thermally insulating bottom layer, supporting at least the powder bed, the heat transfer tube, and the electrically insulating material.

12. The thermal energy storage device as claimed in claim 11, further comprising a cooling tube, embedded in the thermally insulating bottom layer, the cooling tube being connectable to the heat transfer tube.

13. The thermal energy storage device as claimed in claim 1, wherein the at least two electrodes are directly connected to a high-voltage source, of which the voltage exceeds 1,000 Volts.

14. A method of heating a heat transfer fluid, comprising:
    providing a thermal energy storage device as defined in claim 1, comprising a powder bed, at least two electrodes, at least one heat transfer tube thermally coupled to the powder bed via an electrically insulating material;
    passing an electrical current between the at least two electrodes whereby generating heat in the powder bed and heating said electrically insulation material;
    passing the heat transfer fluid through the at least one heat transfer tube whereby heating the heat transfer fluid with heat from the electrically insulation material.

15. The method of claim 14, whereby the electrical current is fluctuating over time.

* * * * *